US006971834B2

(12) United States Patent
Morris

(10) Patent No.: US 6,971,834 B2
(45) Date of Patent: Dec. 6, 2005

(54) REDUNDANT SUPPORT SYSTEMS FOR STOWABLE PASSENGER LIFT ASSEMBLIES

(75) Inventor: Don Morris, Conifer, CO (US)

(73) Assignee: Lift-U, division of Hogan Mfg., Inc., Escalon, CA (US)

( * ) Notice: Subject to any disclaimer, the term of this patent is extended or adjusted under 35 U.S.C. 154(b) by 0 days.

(21) Appl. No.: 10/428,183

(22) Filed: Apr. 30, 2003

(65) Prior Publication Data

US 2004/0057823 A1 Mar. 25, 2004

Related U.S. Application Data

(60) Provisional application No. 60/413,513, filed on Sep. 25, 2002.

(51) Int. Cl.[7] .................................................. B60P 1/00

(52) U.S. Cl. ...................... 414/539; 414/540; 414/545; 414/546; 414/548; 414/921

(58) Field of Search ................................ 414/539, 540, 414/545, 546, 548, 556, 557, 921

(56) References Cited

U.S. PATENT DOCUMENTS

| | | | | |
|---|---|---|---|---|
| 3,651,965 | A * | 3/1972 | Simonelli et al. | 414/540 |
| 4,252,491 | A * | 2/1981 | Hock | 414/540 |
| 4,660,665 | A * | 4/1987 | Powell, Jr. | 177/145 |
| 6,655,895 | B1 * | 12/2003 | Dahl | 414/462 |
| 2002/0057960 | A1 * | 5/2002 | Cohn et al. | 414/546 |

* cited by examiner

*Primary Examiner*—Eileen D. Lillis
*Assistant Examiner*—Michael Lowe
(74) *Attorney, Agent, or Firm*—Christensen O'Connor Johnson Kindness PLLC

(57) ABSTRACT

A wheelchair lift (20) for a vehicle is disclosed. The wheelchair lift includes a lift platform (22) coupled to a support structure (32) by an attachment assembly (74). The lift platform is reciprocal between a stowed position and an extended position, wherein the lift platform is coplanar with a first plane. The wheelchair lift also includes a redundant support assembly (80) in communication with the lift platform to provide secondary support of the lift platform when the lift platform is in the extended position and to maintain the lift platform in a second plane substantially parallel to the first plane if a portion of the attachment assembly fails.

10 Claims, 5 Drawing Sheets

REDUNDANT SUPPORT SYSTEMS FOR STOWABLE PASSENGER LIFT ASSEMBLIES

CROSS-REFERENCE TO RELATED APPLICATION

This application claims the benefit of U.S. Provisional Patent Application Ser. No. 60/413,513, filed on Sep. 25, 2002, the disclosure of which is hereby expressly incorporated by reference, and priority from the filing date of which is hereby claimed under 35 U.S.C. § 119(e).

FIELD OF THE INVENTION

The present invention relates generally to lifts for mobility impaired persons, and more particularly, to redundant support systems for passenger lifts.

BACKGROUND OF THE INVENTION

The Americans with Disabilities Act (ADA) requires the removal of physical obstacles to those who are physically challenged. Included within the scope of the ADA are motor vehicles, such as trains and buses. Specifically, new, used or remanufactured buses shall comply with the applicable provisions of the statute. One such provision requires that deployed platforms, when occupied, shall prevent the platform from dropping an occupant in the event of a single failure of any load-carrying component. Thus, to comply with the ADA, redundant systems need to be included on passenger lifts.

Currently, there are a wide variety of passenger lifts available for motor vehicles. One such lift is adapted to be mounted within an entryway of a motor vehicle. Such a lift includes a reciprocating lift platform mounted within the vehicle and selectively actuatable between at least a raised and a lowered position. The lift platform consists of an inboard platform and an outboard platform. The outboard platform is hingedly attached to the outboard edge of the inboard platform by two sets of horizontally oriented pin assemblies. The pin assemblies are located on opposite sides of the lift platform. The inboard edge of the inboard platform is hingedly attached to two vertical support columns located at the entrance of the passenger vehicle by a second set of two horizontally oriented pin assemblies. The vertical support columns may be selectively raised and lowered to convey the attached lift platform between the raised and lowered positions.

The pin assemblies allow the lift platform to be rotatably transfigured from a stowed position to an extended position. In the extended position, the upper planar surface of the inboard platform is oriented parallel with and above the ground. The outboard platform is rotated on the pin assemblies outward from the inboard platform until the outboard platform is coplanar with the inboard platform. Once in the extended position as described, the lift platform is lowered to the ground or sidewalk so that a mobility impaired individual may board the lift platform. Once in the raised position, the lift platform is level with the floor of the motor vehicle. The mobility-impaired passenger is then free to deboard the lift platform and enter the passenger compartment of the vehicle.

The lift platform is then-rotatably transfigured into the stowed position. This is done by rotating the outboard platform until the upper surface of the outboard platform is parallel with and opposing the upper surface of the inboard platform. The inboard platform and outboard platform are further rotated as a unit into a vertical stowed position, nested between and parallel with the vertical support columns.

Although such a lift is effective at accommodating mobility impaired passengers, such as those in a wheelchair, and providing access into and out of a motor vehicle, it is not without its problems. One such problem associated with currently available passenger lifts, such as the one described above, involves the connection interfaces between the inboard platform and the vertical support columns, and the inboard platform and the outboard platform, respectively. Specifically, if a catastrophic failure occurs at one of the pin assemblies, the inboard platform or outboard platform could canter to one side, separate from one another, or drop, potentially injuring the lift user or others in proximity to the lift. Such a passenger lift is not only dangerous, it also fails to comply with the ADA regarding single failure of any load-carrying component.

For at least the foregoing reason, there exists a need for a passenger lift that includes redundant support systems in the event of a failure at one of the pin assemblies, wherein the redundant support systems comply with the ADA requirements.

SUMMARY OF THE INVENTION

In accordance with the present invention, one embodiment of a passenger lift for conveying a passenger between a first elevation and a second elevation is disclosed. The passenger lift includes a lift platform coupled to a support structure by an attachment assembly. The lift platform is reciprocal between a stowed position and an extended position, wherein the lift platform is coplanar with a first plane. The passenger lift also includes a redundant support assembly in communication with the lift platform to provide secondary support of the lift platform when the lift platform is in the extended position and to maintain the lift platform in a second plane substantially parallel to the first plane if a portion of the attachment assembly fails.

In accordance with the present invention, a second embodiment of a passenger lift for conveying a passenger between a first elevation and a second elevation is disclosed. The passenger lift includes a lift platform coupled to a support structure by an attachment assembly. The lift platform is reciprocal between a stowed position and an extended position, wherein the lift platform is in a first plane. The passenger lift also includes a first limit stop and a second limit stop. If a portion of the attachment assembly fails, the lift platform engages the first and second limit stops, thereby maintaining the lift platform in a second plane substantially parallel to the first plane.

In accordance with the present invention, a third embodiment of a passenger lift for conveying a passenger between a first elevation and a second elevation is disclosed. The passenger lift includes a first platform coupled to a support structure by an attachment assembly. The first platform is reciprocal between a stowed position and an extended position, wherein the first platform is in a first plane. The passenger lift also includes a second platform coupled to the first platform by the attachment assembly. The second platform is reciprocal between a stowed position and an extended position, wherein the second platform is substantially in the first plane. The passenger lift further includes a first redundant support assembly in communication with the first platform to provide secondary support of the first platform when the first platform is in the extended position and to maintain the first platform in a second plane substantially parallel to the first plane if a portion of the attachment assembly fails. The passenger lift still further includes a second redundant support assembly in communication with the second platform to provide secondary support of the second platform when the second platform is in the extended position and to maintain the second platform substantially in the second plane if a portion of the attachment assembly fails.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

The present invention will now be described with reference to the accompanying drawings where like numerals correspond to like elements. FIGS. 1–5 illustrate one embodiment of a stowable passenger lift assembly having a redundant support assembly formed in accordance with the present invention. For purposes of this detailed description, the redundant support assembly will be subdivided into a first and a second redundant support system. For clarity, the vehicle to which the passenger lift assembly may be installed within has not been illustrated. Although the first and second redundant support systems are discussed in relation to their use with a passenger lift assembly mounted in a motor vehicle, it is apparent to those skilled in the art that this is done for illustrative purposes and should not be construed as limiting the scope of the invention. For example, it is apparent to those skilled in the art that the first and second redundant support systems are equally applicable to any type of lift, including cargo lifts, and passenger lifts mounted in locations other than in a vehicle, such as a stairway. Additionally, although illustrative terms such as vertical and horizontal are used herein, they are descriptive in nature and should not be construed as limiting.

The present invention is directed to a first redundant support system located at the connection interface between the inboard platform and the mounting structure of a stowable passenger lift assembly. The present invention is further directed to a second redundant support system located at the connection interface between the outboard platform and the inboard platform of a stowable passenger lift assembly. In the event of a failure at one of the connections between the inboard platform and either the mounting structure or the outboard platform, the first redundant support system constrains movement of the inboard platform with respect to the mounting structure, while the second redundant support system constrains movement of the outboard platform with respect to the inboard platform, respectively. Accordingly, the first and second redundant support systems provide a continued connection between the mounting structure and the inboard platform, and the inboard platform and the outboard platform, respectively, thereby providing a safety feature for the passenger lift assembly which also complies with ADA requirements.

Figure 1:
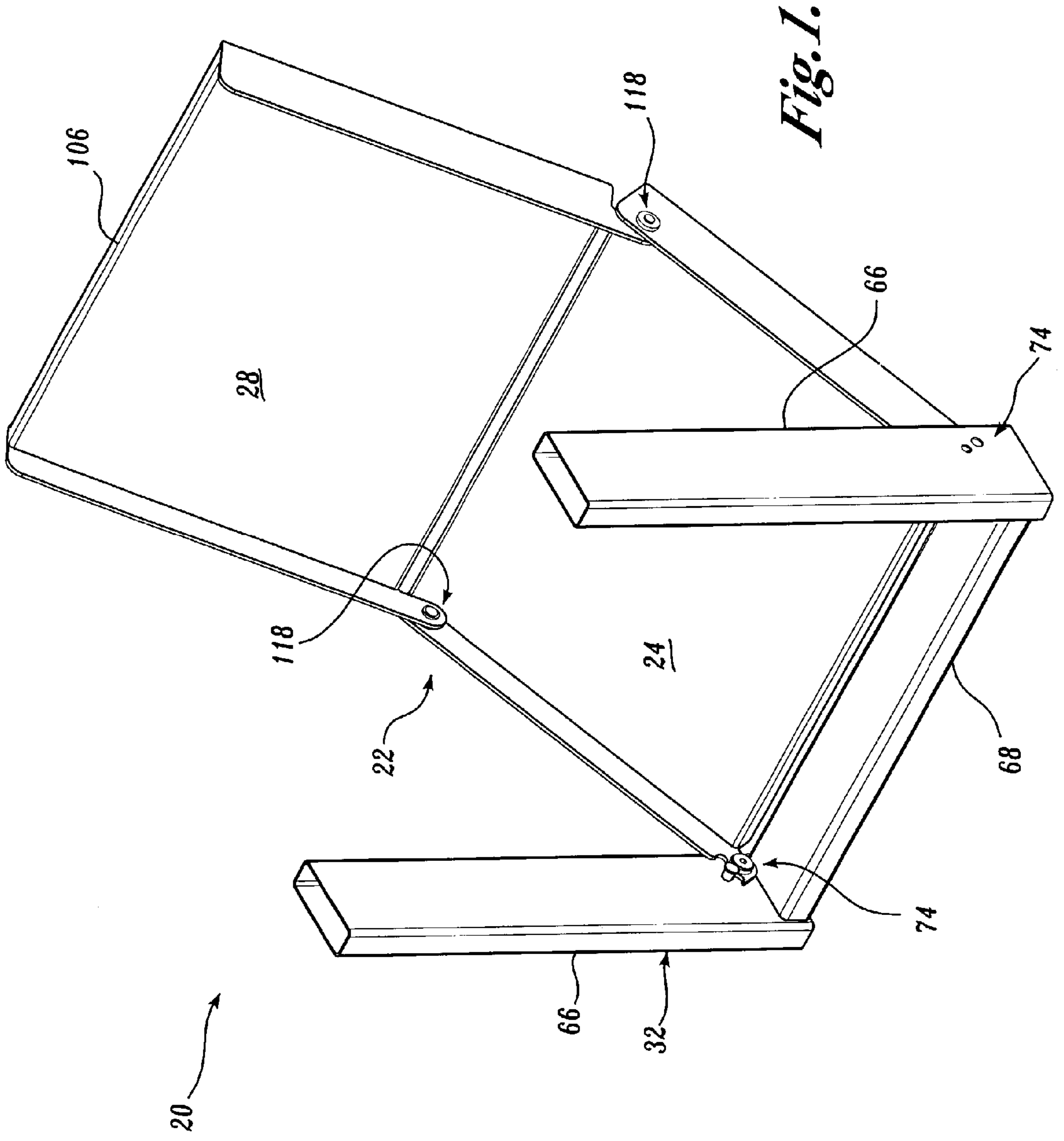
FIG. 1 is a perspective view of one embodiment of a stowable passenger lift assembly formed in accordance with the present invention.

One illustrative embodiment of a stowable passenger lift assembly, generally designated 20, incorporating the redundant support systems of the present invention is shown in FIG. 1. Generally described, the stowable passenger lift assembly 20 (hereinafter "lift assembly 20") includes a lift platform 22 for supporting a passenger. The lift platform 22 is formed by an inboard platform 24 pivotally attached at one end to a folding outboard platform 28 by pin assemblies 118. The lift platform 22 is pivotally attached to a mounting structure 32 by pin assemblies 74 at the opposite end of the inboard platform 24. The pin assemblies 74 and 118 are collectively referred to as an attachment assembly. Although the attachment assembly of the illustrated embodiment is described as formed from pin assemblies, it should be apparent to those skilled in the art that the attachment assembly may be formed from other connecting members than those depicted. For instance, the attachment assembly may include connecting members that permit motion other than pivotal movement, such as translational movement. The lift assembly 20 includes other components, not shown for ease of illustration but well known in the art, such as a reciprocating assembly for lifting the platform between a lowered and a raised position and reciprocating the lift platform 22 between a stowed and an extended position.

The lift assembly 20 is adapted to be slidably mounted to a frame structure of a vehicle (not shown), such as the doorframe of the entryway of a bus, by the mounting structure 32. In partial operation, the lift platform 22 reciprocates between the stowed and extended positions, as shown partially in phantom in FIG. 3. In the stowed position, the folding outboard platform 28 is juxtaposed against the inboard platform 24, with the folding outboard platform 28 and the inboard platform 24 disposed in a vertical orientation. In the extended position, the folding outboard platform 28 and the inboard platform 24 extend horizontally outward from the mounting structure 32 and are substantially coplanar.

Figure 2:
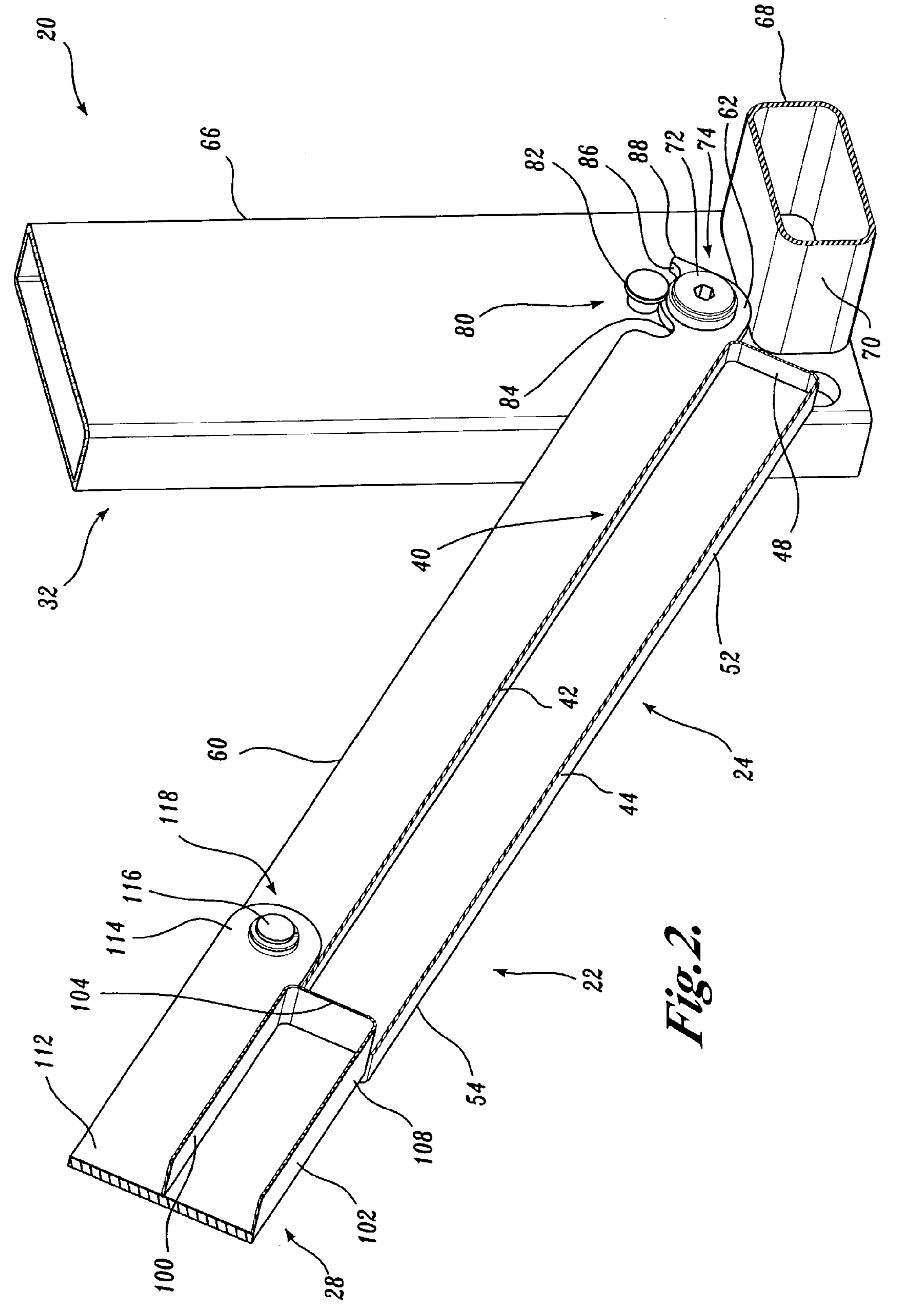
FIG. 2 is a partial cross-section view of the stowable passenger lift assembly shown in FIG. 1, wherein the stowable passenger lift assembly is in a semi-extended position.
Figure 3:
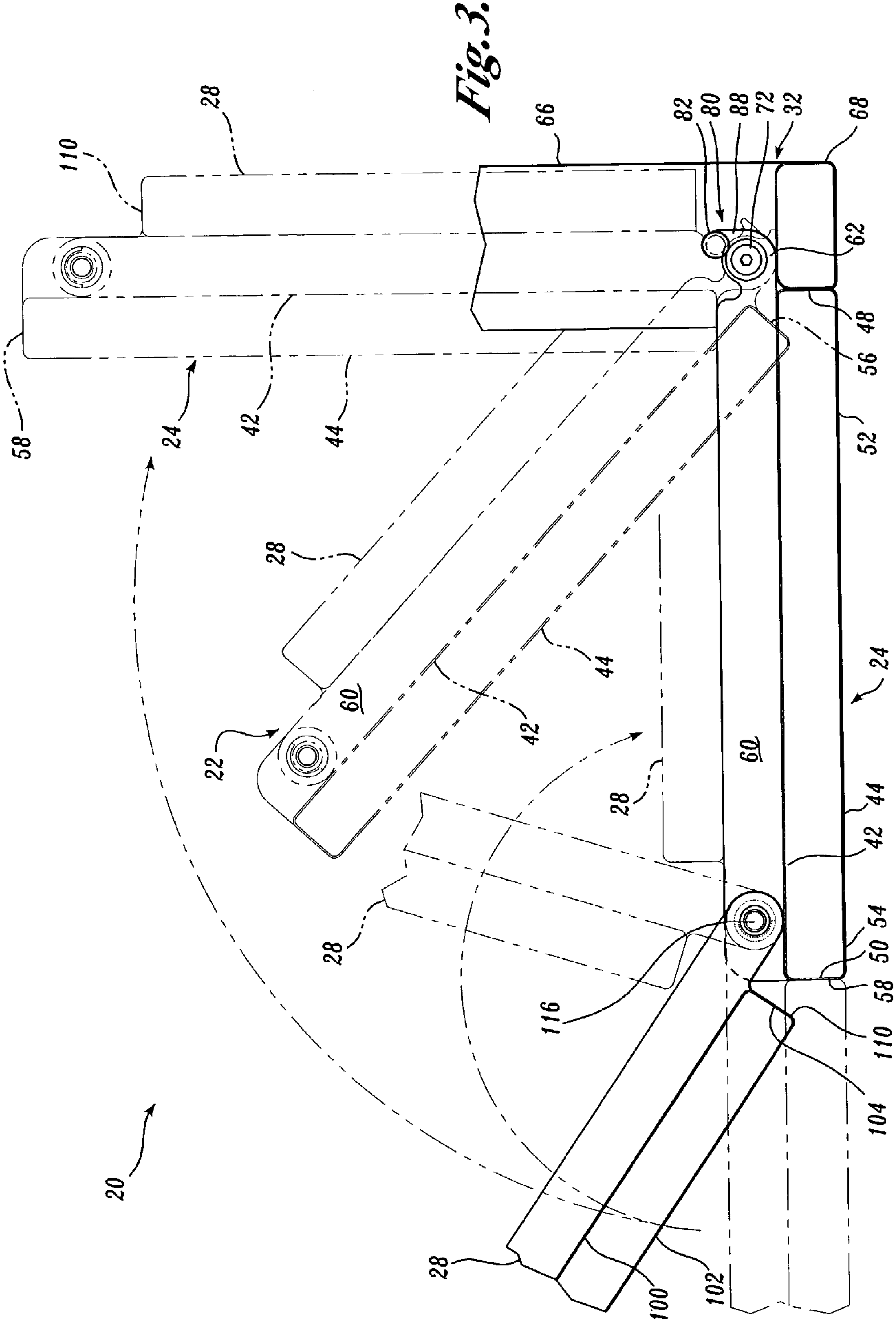
FIG. 3 is a side elevational view of the stowable passenger lift assembly of FIG. 2 reciprocating from an extended position to a fully stowed position.

Referring now to FIG. 2, the inboard platform 24 of the lift platform 22 will now be described. For ease of illustration, FIG. 2 is a partial cross-sectional view of the lift assembly 20 in a semi-extended position. FIG. 2 illustrates only one side of the lift assembly 20; however, the other side of the lift assembly 20 is identical in construction and operation. The inboard platform 24 includes a rigid floor structure 40 for supporting a mobility-impaired passenger. In the embodiment shown, the floor structure 40 is formed by upper and lower generally planar floor panels 42 and 44, preferably of a metallic material, such as steel, interconnected by planar end walls 48 and 50 (end wall 50 is best shown in FIG. 3) positioned at the inboard and outboard ends 52 and 54 of the inboard platform 24, respectively. For clarity in the description, the terms "inboard" and "outboard" are used herein to convey relative positions of portions of the lift assembly 20 when mounted within a vehicle, and therefore should not be construed as limiting the scope of the present invention.

The end walls 48 and 50 of the inboard platform 24 are positioned in a plane substantially orthogonal to the upper and lower panels 42 and 44, as best shown in FIG. 3. The end wall 48 includes a planar support surface 56 and the end wall 50 includes a planar restraining surface 58. Referring to FIGS. 2 and 3, the inboard platform 24 further includes side curbs 60, which extend upwardly from each side of the upper panel 42. The side curbs 60 begin at about the outboard edge of the inboard platform 24 and extend longitudinally to a position past the inboard end wall 48, thereby forming side curb extensions 62. The side curb extensions 62 include apertures, which are adapted for receiving journal members, such as pivot pins 72. Each side curb 60 enhances the structural strength of the inboard platform 24 and provides a bumper for the sides of the inboard platform 24, thereby increasing the safety of the lift assembly 20. As will be described in more detail below, the inboard platform 24 is pivotally attached to the mounting structure 32 at the inboard end 52 of the side curbs 60, and pivotally attached to the outboard platform 28 at the outboard end 54 of the side curbs 60.

Referring now to FIGS. 1 and 2, the mounting structure 32 of the present invention will now be described in detail. The mounting structure 32 is preferably constructed of a metallic material, such as steel, and includes two spaced apart, vertically disposed support columns 66 interconnected by a horizontally disposed base 68. The distance between the support columns 66 is suitable for receiving the inboard platform 24 therebetween, as best shown in FIG. 1. Referring now to FIG. 2, the base 68 of the illustrative embodiment is substantially rectangular in cross-section and includes an outboard-facing restraining surface 70 adapted to act as a limit stop and abut against the support surface of the inboard platform 24 when the lift assembly 20 is in the extended position. The vertical columns 66 are adapted to be selectively raised and lowered by a reciprocating assembly (not shown). Since the reciprocating assembly is not part of the present invention, it will not be described in detail.

The vertical support columns 66 include apertures (hidden in FIG. 2) disposed a suitable distance above the top surface of the base 68 for receiving journal members, such as pivot pins 72. Any conventional pivot pin may be used, and thus it will not be described in any more detail. As assembled, the pivot pins 72 extend through the support column apertures and the corresponding apertures in the inboard ends 52 of side curbs 60, thereby forming the pin assemblies 74. Thus, the pin assemblies 74 pivotally attach the inboard platform 24 to the mounting structure 32. As such, the pivot pins 72 define a horizontal pivot axis of the inboard platform 24 with respect to the mounting structure 32.

In accordance with one aspect of the present invention, the lift assembly 20 further includes a first redundant support system for providing a safety feature positioned at the connection interface (i.e. pin assemblies 74) between the inboard platform 24 and mounting structure 32. Referring now to FIGS. 2 and 3, the first redundant support system 80 includes a redundant support member 82 fixedly secured to each of the vertical support columns 66 above and slightly inboard of the pivot pins 72. As best shown in FIG. 2, the redundant support member 82 may be, for example, a cylindrical pin having a flat head. To cooperate with the redundant support members 82, the side curbs extensions 62 include an outboard limit recess 84 and an inboard recess 86 that defines a support arm 88. Each recess 84 and 86 is sized and configured to receive the redundant support members 82 when the inboard platform 24 is oriented in the stowed position and the extended position, respectively, the redundant support member 82 acting as a limit stop. The support arm 88 extends substantially orthogonal from the upper panel 42, and is adapted to contact the redundant support member 82 in the extended position. Thus, in this embodiment, the redundant support member 82, the recesses 84 and 86, and the support arm 88 form the first redundant support system 80.

Referring now to the operation between the inboard platform 24 and the mounting structure 32, attention is directed to FIG. 3. FIG. 3 is a side elevational view of the lift assembly 20 reciprocating from an extended position to a fully stowed position. In normal operation, the inboard platform 24 pivots about pivot pins 72 from the vertical stowed position to the horizontal extended position. In the stowed position, the upper surface of the outboard platform 28 is parallel with and opposes the upper surface of the inboard platform 24, the inboard platform 24 and outboard platform 28 are nested between and substantially parallel with the vertical support columns 66, and the redundant support member 82 is received by the limit recess 84 (see FIG. 2). Upon rotation from the vertical position to the extended position, the inboard platform 24 continues to rotate until the support surface 56 of the inboard platform 24 contacts, and thus, is restrained by restraining surface 70 (see FIG. 2) of the base 68. In the extended position, the upper planar surface of the inboard platform 24 is oriented in a substantially horizontal position, the redundant support member 82 is received by the recess 86 (see FIG. 2), and the support arm 88 abuts against the inboard side of the redundant member 82.

When the lift assembly 20 is in the extended position and the lift platform 22 is supporting a passenger, the load applied thereto by the passenger is supported by the restraining surface 70 of the mounting structure 32 in conjunction with the pivot pins 72. However, the redundant support members 82 are in a no-load condition in the extended position when the pin assemblies 74 are functioning properly. As such, the rotational and translational movement of the lift platform 22 is constrained by the contact between the support surface 56 and the restraining surface 70, and the pivot pins 72.

Referring back to FIGS. 1 and 2, the folding outboard platform 28 of the lift platform 22 will now be described in detail. As shown best in FIG. 2, the outboard platform 28 is similarly constructed to the inboard platform 24 and includes upper and lower generally planar panels 100 and 102 interconnected by end walls 104 and 106 (end wall 106 is shown in FIG. 1) positioned at the inboard end 108 and outboard end (not shown) of the folding outboard platform 28, respectively. Referring now to FIG. 3, the end wall 104 lies in a plane substantially orthogonal to the upper and lower panels 100 and 102, and includes a planar support surface 110 that is adapted to abut against the restraining surface 58 of the inboard platform 24 in the extended position, the restraining surface 58 acting as a limit stop.

As best shown in FIG. 2, the outboard platform 28 further includes side curbs 112 that extend upwardly from each side of the upper panel 100 and extend longitudinally along its length to a position past the inboard end wall 104, thereby forming side curb extensions 114. The side curb extensions 114 include apertures through which the folding outboard platform 28 is pivotally attached by journal members, such as pivot pins 116, to the outboard end 54 of the inboard platform 24. Any conventional pivot pin may be used, and thus it will not be described in any more detail. As assembled, the pivot pins 116 extend through inboard platform apertures and the corresponding outboard platform apertures at the inboard end 108 of side curbs 112, thereby forming the pin assemblies 118. The pin assemblies 118 pivotally attach the inboard platform 24 to the folding outboard platform 28. As such, the pivot pins 116 define a horizontal pivot axis of the folding outboard platform 28 with respect to the inboard platform 24.

Figure 4:
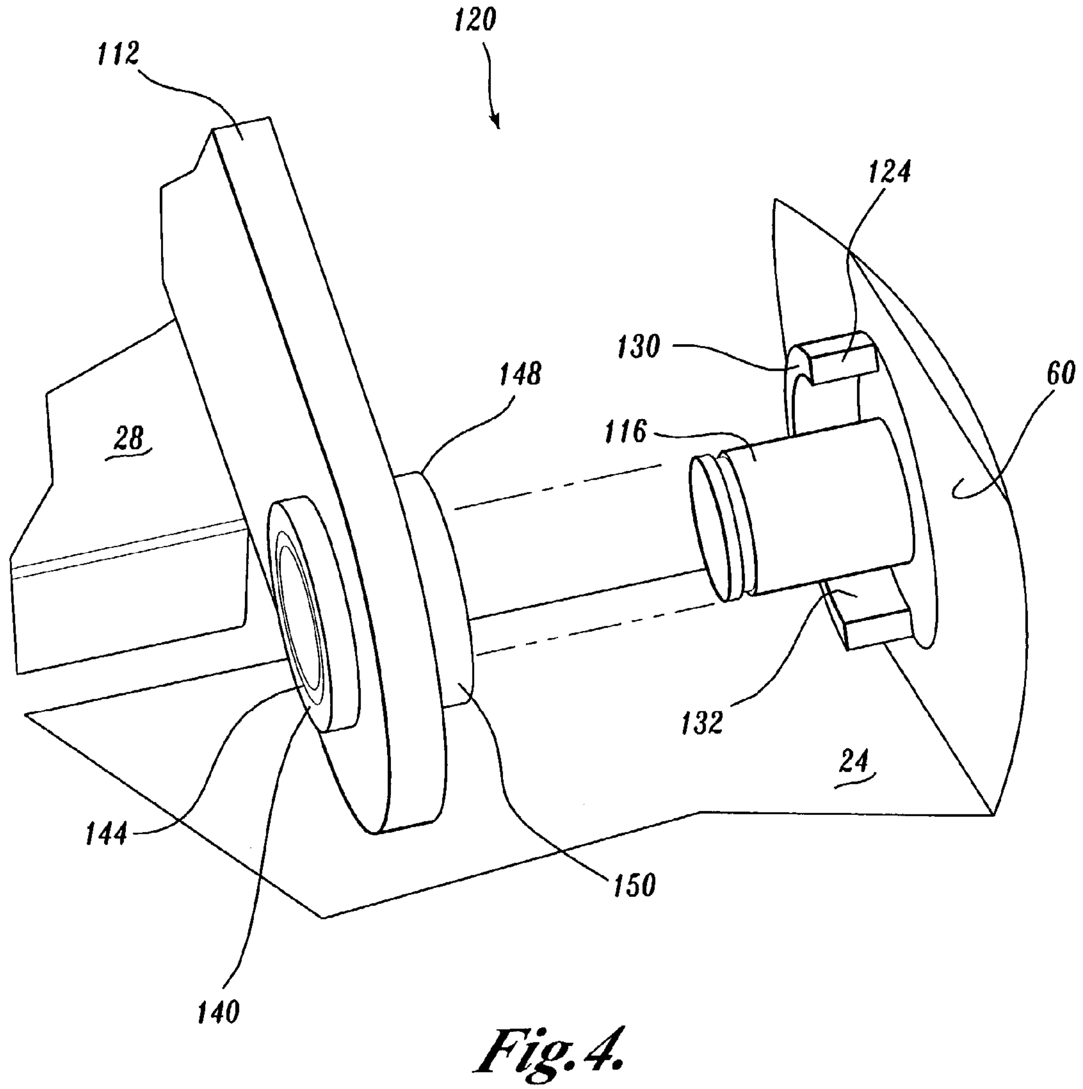
FIG. 4 is an exploded view of the pivot connection between the folding outboard platform and the inboard platform of the stowable passenger lift assembly of FIG. 1.
Figure 5:
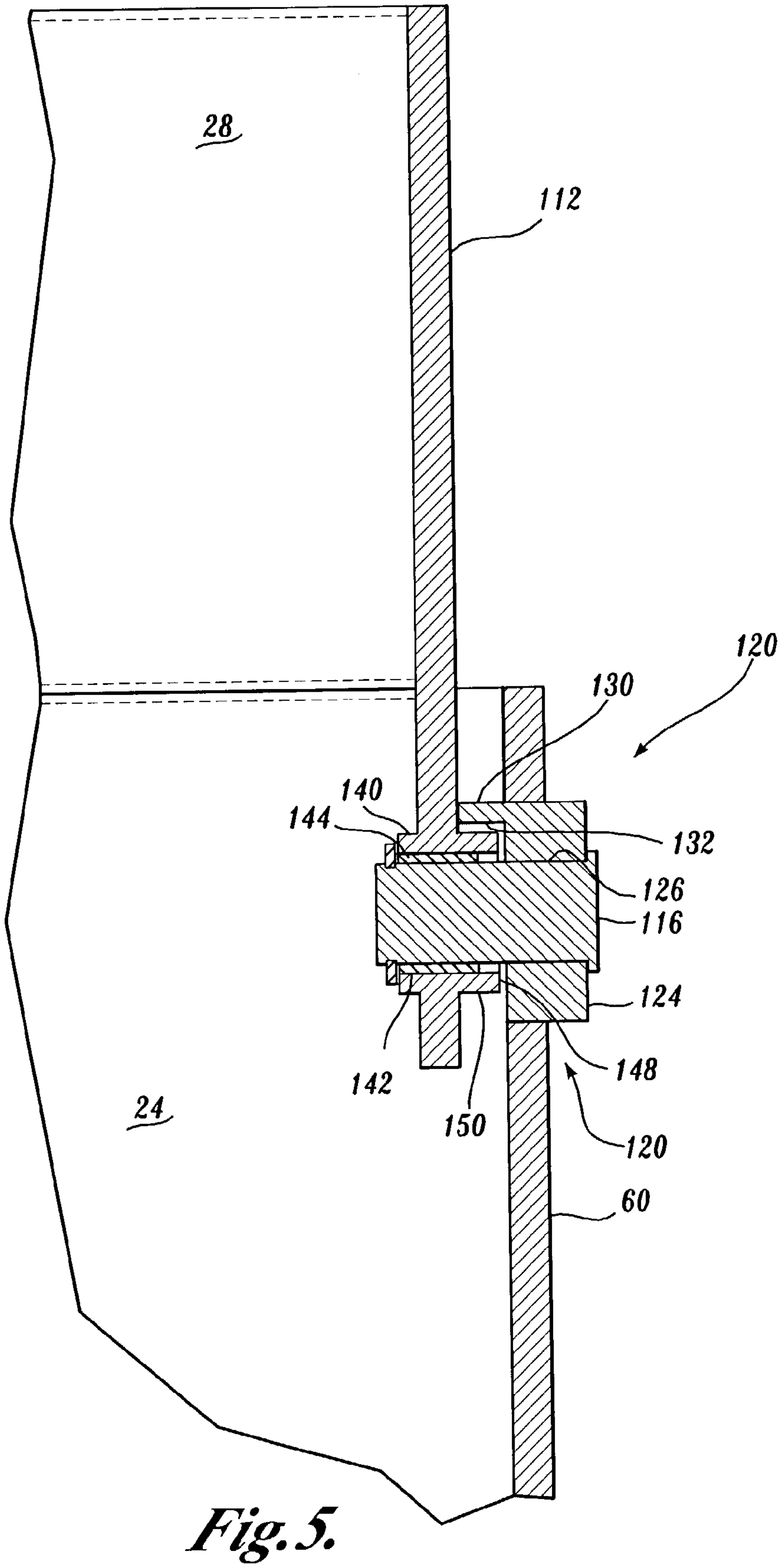
FIG. 5 is a horizontal cross sectional view of the pivot connection of FIG. 4, when the stowable passenger lift assembly is in the extended position.

In accordance with another aspect of the present invention, the lift assembly 20 further includes a second redundant support system for providing a safety feature positioned at the connection interface (i.e. pin assemblies 118) between the folding outboard platform 28 and the inboard platform 24. Referring now to FIGS. 4 and 5, the second redundant support system 120 includes metallic bushings 124 fixedly secured the outboard apertures of the inboard platform side curbs 60. The bushings 124 include a cylindrical bore 126 (see FIG. 5) for receiving the pivot pins 116, and a semi-circular inward extending flange 130. As shown in FIG. 4, the open end of the flange 130 faces the inboard end of the inboard platform 24. Alternatively, the inward extending flange 130 may, for example, extend circumferentially to form a completely circular flange. In either case, the flange 130 includes an inner safety surface 132 for constraining the movement of the folding outboard platform 28 in the event of a failure of pivot pins 116, the inner safety surface 132 acting as a limit stop.

Referring now to FIGS. 4 and 5, the redundant support system 120 further includes a cylindrical boss 140 that extends on both sides of the outboard platform side curbs 112. The boss 140 defines a cylindrical, longitudinally extending bore 142 sized to receive a sleeve bearing 144, which in turn, includes a bore sized for receiving the pivot pin 116 in rotational engagement. The redundant support system 120 may omit the sleeve bearing 144, if desired. The outward extending portion 148 of the boss 140 defines an abutment surface 150 along its outer surface. The outer diameter of the portion 148 of boss 140 is sized to seat within the flange 130 so that the abutment surface 150 contacts the safety surface 132 of the flange 130 when assembled.

Referring now to the operation between the inboard platform 24 and the folding outboard platform 28 of the lift platform, attention is directed again to FIG. 3. In normal operation, the outboard platform 28 pivots about pivot pins 116 from a folded position, wherein the upper surface of the outboard platform 28 is parallel with and opposes the upper surface of the inboard platform 24 in the horizontal orientation, to the extended position, wherein the upper surface of the outboard platform 28 is substantially coplanar with the upper surface of the inboard platform 24. Upon rotation from the folded position to the extended position, the outboard platform 28 continues to rotate until the support surface 110 of the outboard platform 28 contacts, and thus, is restrained by restraining surface 58 of the inboard platform 24. In the extended position, the inboard and outboard platform assemblies 24 and 28 form a substantially horizontal lift platform for supporting a passenger between the raised and lowered position.

When the lift assembly 20 is in the extended position and the lift platform 22 is supporting a passenger, the passenger applies a load thereto. A portion of the load applied thereto is supported by the restraining surface 58 of the inboard platform 24 in conjunction with the pivot pins 116 on its outboard end. Additionally, the passenger load is supported by restraining surface 70 of the mounting structure 32 in conjunction with the pivot pins 72, as was described above.

However, the inner safety surfaces 132 are in a no-load condition in the extended position when the pin assemblies 118 are functioning properly. As such, the rotational and translational movement of the outboard platform 28 is constrained by the contact between the support surface 110 and the restraining surface 58, and the pivot pins 116.

With reference to FIGS. 1–5, one example of the operation of the lift assembly 20 incorporating the first and second redundant support systems 80 and 120 will now be described in detail. The lift assembly 20 begins in the stowed position. In the stowed position, the upper surface of the outboard platform 28 is parallel with and opposes the upper surface of the inboard platform 24, the inboard platform 24 and outboard platform 28 are nested between and substantially parallel with the vertical support columns 32, and the redundant support members 82 are received by the limit recesses 84. When the inboard platform 24 is rotated to the extended position, the inboard platform 24 rotates about a horizontal axis defined by pivot pins 72. Rotation continues until the support surface 56 of the inboard platform 24 contacts the restraining surface 70 of the mounting structure 32. In this position, the upper planar surface of the inboard platform 24 is oriented in a substantially horizontal position and will be maintained in a substantially horizontal position throughout the remaining deployment of the lift platform 22 due to the contact between the support surface 56 and the restraining surface 70. Moreover, the redundant support members 82 are received by the inboard recesses 86, and the support arms 88 rest against the redundant support members 82, preferably in a substantially no-load configuration. It should be apparent that the phrase "substantially horizontal position" includes the normal operating range of a lift assembly within the scope of this disclosure. At this stage, the outboard platform 28 has yet to be extended and remains folded, resting upon the inboard platform 24.

In continuing the deployment of the lift assembly 20, the outboard platform 28 is rotated about pivot pins 116, outward from the inboard platform 24 until the support surface 110 of the outboard platform 28 contacts the restraining surface 58 of the inboard platform 24, limiting further rotation of the outboard platform 28. In the extended position, the outboard platform is supported by the restraining surface 58 of the inboard platform 24, and the pivot pins 116. Once in the extended position as described, the lift platform 22 formed by the inboard and outboard platforms 24 and 28 may be lowered by a reciprocating assembly (not shown) to a position below the floor of the vehicle, until the outward edge (not shown) of the outboard platform 28 contacts the ground, curb or the like. In this position, a passenger may traverse onto the lift platform 22.

Once the passenger is supported by the lift platform 22, the drive assembly (not shown) may then be actuated to raise the vertical support columns 32, and thereby raise the lift platform 22. Once in the, raised position, the lift platform 22 is level with the floor of the passenger vehicle (not shown). The passenger is then free to deboard the lift platform 22 into the passenger compartment of the vehicle.

In the event of a failure of one of the pivot pins 72 while the passenger is on the lift platform 22, the movement of the lift platform 22 is constrained and maintained horizontally by the first redundant support system 80. Preferably, in the event of a failure of one of the pivot pins 72, the first redundant support system 80 aids in maintaining the lift, platform at substantially the same elevation of the lift platform prior to the failure of the pivot pin 72, and substantially parallel with the position of the lift platform just prior to the failure of the pivot pin 72.

For the purposes of the detailed description, substantially the same elevation means that a separation distance separating the lift platform prior to the failure of the pivot pin 72 and after the failure of the pivot pin 72 is of a degree that would not reasonably lead to an injury of an occupant of the lift. Similarly, for the purposes of this detailed description, substantially parallel means that a separation angle present between the inclination of the lift platform prior to the failure of the pivot pin 72 and the inclination of the lift platform after the failure of the pivot pin 72 is of a degree that would not reasonably lead to injury to an occupant of the lift platform, such as by causing a wheelchair to roll with sufficient force to overrun the retaining curbs or other such restraints, or cause an impact injury to the user, or that would cause an unreasonable loss of balance to a standing user of the lift.

The first redundant support system 80 maintains the horizontal orientation of the lift platform 22 in the event of a failure of one of the pivot pins 72 through the redundant support member 82. More specifically, the support arm 88 of the side curb 60 (on the side of the failed pin) engages the redundant support member 82, inhibiting further rotation about the restraining surface 70 and/or translation of the inboard platform 24 in a direction outboard of the vehicle. Accordingly, the load previously supported by the failed pin is supported by the redundant support member 82 while maintaining the inboard platform 24 in a horizontal position. Thus, the first redundant support system 80 acts as a redundant support structure, whereby in the event of a failure of one of the load bearing pivot pins 72, the load associated with the failed pivot pin is transferred to and supported by the redundant support member 82.

Additionally, in the event of a failure of one of the pivot pins 116 while the passenger is on the lift platform 22, the movement of the outboard platform 28 is constrained and maintained at substantially the same elevation and substantially parallel with the position of the lift platform just prior to the failure of the pivot pin 116 by the second redundant support system 120. Specifically, the abutment surface 150 of boss 140 (on the side of the failed pin) engages with and is restrained by the safety surface 132 of the flange 130, inhibiting further rotation about the restraining surface 58 and/or translation of the outboard platform 28 in a direction outboard of the vehicle. Accordingly, the load previously supported by the failed pin is supported by the flange 130 while maintaining the outboard platform 28 in a horizontal position. Thus, the second redundant support system 120 acts as a redundant support structure, whereby in the event of a failure of one of the load bearing pivot pins 116, the load associated with the failed pivot pin is transferred to and supported by the flange 130.

Once the passenger has entered the vehicle, the lift assembly 20 is then rotatably transfigured into the stowed position. This is accomplished by rotating the outboard platform 28 about pivot pins 116, until the upper surface of the outboard platform 28 is parallel with and opposes the upper surface of the inboard platform 24. The inboard platform 24 and outboard platform 28 are then rotated about the pivot pins 72 until the outboard limit recesses 84 contacts the redundant support member 82. In this position, the inboard platform 24 and outboard platform 28 are secured by means well know in the art, such as by latches, in their stowed position, nested between and substantially parallel with the vertical support columns 66.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

What is claimed is:

1. A wheelchair lift for a vehicle, the wheelchair lift comprising:

(a) an attachment assembly with first and second portions;

(b) a first platform coupled to a support structure by the first portion of the attachment assembly comprising a first primary support, the first platform reciprocal between a stowed position and an extended position, wherein the first platform is in a first plane;

(c) a second platform coupled to the first platform by the second portion of the attachment assembly comprising a second primary support, the second platform reciprocal between a stowed position and an extended position, wherein the second platform is substantially in the first plane;

(d) a first redundant support assembly in communication with the first platform to provide a first secondary support of the first platform when the first platform is in the extended position and to maintain the first platform in a second plane substantially parallel to the first plane if the first portion of the attachment assembly fails; and (e) a second redundant support assembly in communication with the second platform to provide a second secondary support of the second platform when the second platform is in the extended position and to maintain the second platform substantially in the second plane if the second portion of the attachment assembly fails, wherein the second redundant support assembly comprises:

(i) a first limit stop; and (ii) a second limit stop, wherein if a portion of the attachment assembly fails, the second platform engages the first and second limit stops, thereby maintaining the second platform substantially in the second plane, wherein the attachment assembly comprises a pivot for pivotally coupling the first platform to the second platform, and wherein the pivot further comprises a boss for receiving a pivot pin, wherein the first limit stop at least partially encircles the boss.

2. The wheelchair lift of claim 1, wherein the first redundant support assembly comprises:

(a) a third limit stop; and (b) a fourth limit stop, wherein if a portion of the attachment assembly fails, the first platform engages the third and fourth limit stops, thereby maintaining the first platform in the second plane.

3. The wheelchair lift of claim 2, wherein when the first platform is the extended position, the third limit stop engages a recess in the first platform.

4. The wheelchair lift of claim 2, wherein if a portion of the attachment assembly fails, the third or the fourth limit stop engages the first platform to impede the first platform from moving outward from a location wherein the first platform is coupled to the support structure.

5. The wheelchair lift of claim 2, wherein the third limit stop comprises a pin.

6. The wheelchair lift of claim 1, wherein the second platform further comprises an outward extending portion, wherein the first limit stop at least partially encircles the outward extending portion.

7. The wheelchair lift of claim 1, wherein the first platform is pivotally coupled to the support structure and the second platform is pivotally coupled to the first platform, and wherein the first and second platforms rotate in a first direction when reciprocated from the stowed position to the extended position.

8. The wheelchair lift of claim 7, wherein when the first platform is in the extended position, at least one of the third and fourth limit stops engage the first platform to impede the first platform from rotating in the first direction.

9. The wheelchair lift of claim 7, wherein when the second platform is in the extended position, at least one of the first and second limit stops engage the second platform to impede the second platform from rotating in the first direction.

10. The wheelchair lift of claim 1, wherein the first plane is at substantially the same elevation as the second plane.

* * * * *